United States Patent Office 3,358,229
Patented Dec. 12, 1967

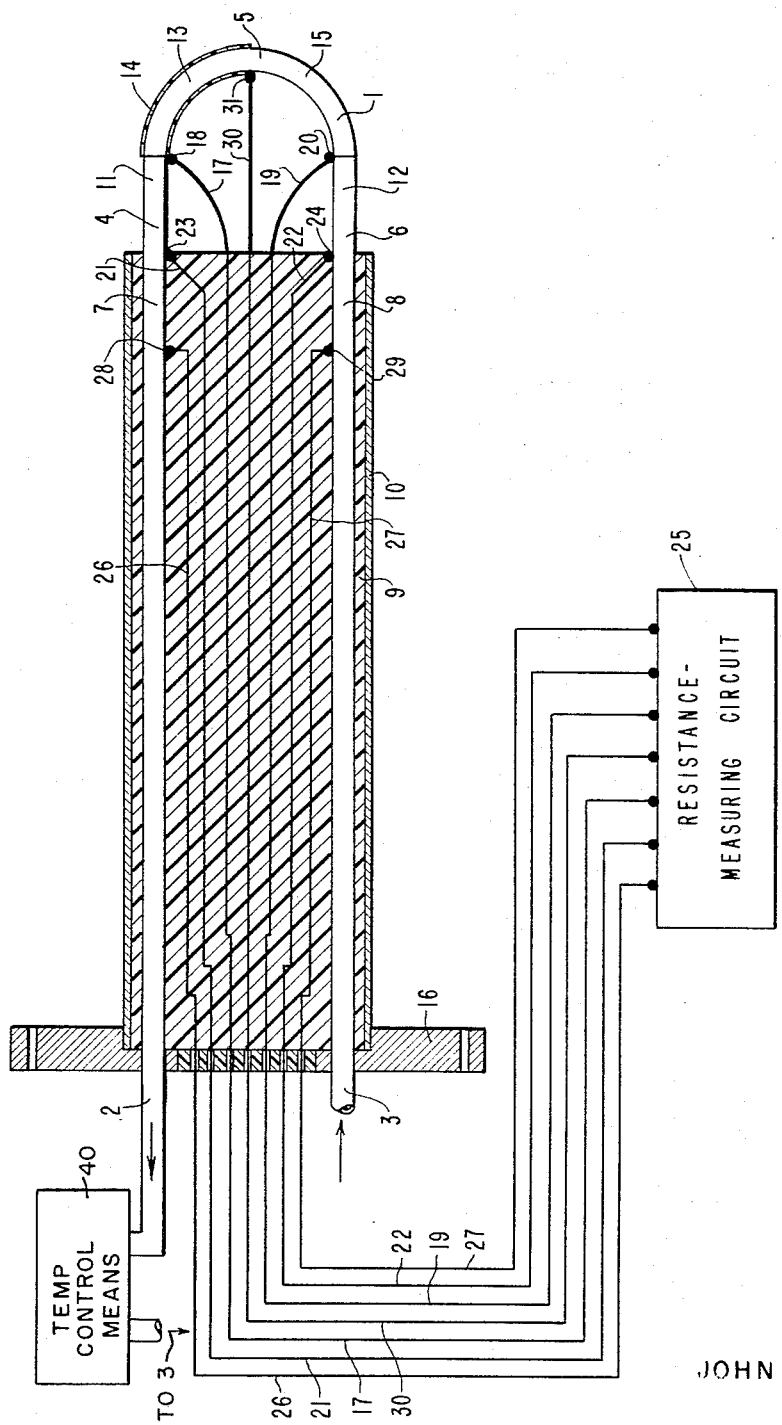

3,358,229
ELECTRICAL CORROSION PROBE HAVING A PLURALITY OF TEST SPECIMEN SEGMENTS
John W. Collins, Beaumont, Tex., assignor to Mobil Oil Corporation, a corporation of New York
Filed June 29, 1964, Ser. No. 378,805
4 Claims. (Cl. 324—65)

ABSTRACT OF THE DISCLOSURE

A U-shaped tubular corrosion probe having a plurality of test specimen segments and temperature control means comprising fluid circulating means or electrical means internally of said probe to maintain each of the test specimens at substantially the same temperature. Electrical conductors are provided to interconnect at least two points spaced apart along each segment and a resistance measuring circuit.

This invention relates to apparatus for measuring corrosion of test specimens exposed to a fluid environment, and more particularly for use in comparing the corrosive effects of a fluid environment on dissimilar test specimens exposed thereto.

It is well known that corrosion-testing of various materials in environments in which their use is contemplated can frequently provide valuable information bearing on the relative desirability of the various materials for the contemplated uses. Such information often makes possible great savings of time and expense which would otherwise be consumed in redesign and replacement of articles which become corroded during use in a corrosive environment.

Such tests have particular importance in connection with fluid environments, particularly those including flowing fluids or fluids at elevated temperatures, e.g. confined streams of liquids or vapors or mixtures thereof in various chemical processing installations or in heat exchange equipment utilizing a fluid heat exchange medium.

It is also well known that corrosion rates can vary considerably with a number of characteristics of the corrosive fluid environment. Corrosion rates often vary markedly between different locations in the same body or stream of corrosive fluid because of variations in such characteristics, e.g. in the composition, temperature or flow characteristics, within the body or stream of fluid. Accordingly, when it is desired to measure the rates at which several test specimens corrode in a specific location in a given fluid environment, e.g. to determine by comparison of the results which of several materials would be most desirable for use at that specific location, it is often necessary that the several test specimens are disposed, insofar as it is possible, in the precise location of particular interest in the test. Since fluid conditions also vary with time in many chemical processing and heat exchange streams, it is also necessary in many instances that corrosion tests that are desirably comparative of several materials of construction be based on simultaneous periods of exposure of the several materials to the corrosive fluid.

However, because of various problems of space, accessibility and structural strength of the fluid-containing vessels which have limited the size of apparatus conveniently inserted for such tests, corrosion probes used in the past have generally been constructed to provide a measure of the corrosion of only one material sample at a time. Thus simultaneous comparative tests with such probes have been possible only with the use of a plurality of such probes. However, the use of multiple probes is attended by multiplication of equipment costs and generally by most or all of the difficulties of space, access, etc., incurred by the use of a single large multi-sample probe.

It is also frequently desirable to maintain the test specimens at temperatures different from that of the fluid test environment to more closely simulate the contemplated use of the materials being tested, for example a contemplated use in construction of piping or other equipment which would be in contact with the fluid environment while itself containing or conducting a second fluid at a temperature different from that of the external fluid. Again, however, the test specimens must be maintained at substantially identical temperatures if comparative corrosion measurements are to be obtained. This generally requires the use of heating or cooling means internal and common to all of the test specimens, e.g. electric heating means or means for passage of a fluid medium of controlled temperature through the interiors of the test specimens, but attempts to incorporate such temperature-control means in probes have compounded the problems of space, etc., encountered in attempts to provide simultaneous comparative corrosion tests of multiple specimens.

For the foregoing reasons, there has long existed a need for apparatus which, in corrosion measurements of multiple test specimens, can provide measurements which are reliably comparative with respect to a precise location in a fluid environment, without the greater expense, inconvenience and other difficulties associated with the use of separately inserted multiple probes or of inordinately large multi-specimen probes, and, if desired, while maintaining the specimens at a temperature different from that of the fluid test environment.

Accordingly, it is a broad object of this invention to provide means useful in measuring the corrosion of multiple dissimilar test specimens simultaneously subjected to a fluid environment.

It is another object of this invention to provide means useful in supplying comparable measures of the corrosion of multiple test specimens simultaneously exposed to substantially identical fluid environments.

It is a further object of this invention to provide apparatus useful in subjecting plural corrosion test specimens to a specific fluid environment without inserting an undesirable multiplicity of probes into said environment.

It is a specific object of this invention to provide means useful in comparing the corrosion of multiple dissimilar test specimens simultaneously subjected to a specific external fluid environment and maintained at substantially the same temperature different from that of the fluid environment.

Other objects and advantages of this invention will become apparent to those skilled in the art, from the following detailed description.

It has been found that the above stated objects can be realized with apparatus, adapted to provide comparable measures of the corrosive effects of a fluid environment on at least two test specimens made of dissimilar electrically-conductive materials by detection of resistivity changes accompanying corrosion of the exposed test specimens, and comprising probe means having spaced adjacent legs and a body element forming a continuum between said legs and adapted to be extended into a fluid environment, said body element comprising a plurality of electrically-conductive test specimens adapted to be maintained at substantially the same temperature, and conductor means in electrically-conductive relationship with at least two points spaced apart on each of at least two of said test specimens and adapted for connection to means for measuring the resistance to passage of electricity between two of said points. In a specific embodiment of the invention, the test specimens are hollow and adapted to be maintained at substantially the same temperature by circulation of a fluid medium through the interiors of said test specimens. In another specific embodiment of the invention, at least one of said test specimens is protected along a portion of its length from contact with said fluid environment, and said conductor means are in electrically-conductive relationship with two points spaced apart on the protected portion of said test specimen.

The invention can be understood more readily by reference to the drawing attached hereto and made a part of this disclosure, and the following detailed description. The drawing illustrates, partly in schematic form, the novel electrical corrosion-measuring apparatus of this invention, whereby comparable measures of the corrosion of multiple test specimens can be obtained.

In the drawing probe 1 having spaced legs 2 and 3 includes three dissimilar tubular test specimen segments 4 (steel), 5 (Monel) and 6 (Admiralty brass). A first portion 7 of the length of steel specimen 4 is housed within a cylindrical (3/8 inch O.D.) probe shell 10 which can be made of a corrosion-resistant material, e.g. stainless steel, and which has been filled with a dielectric corrosion-resistant filler material 9, e.g. a ceramic or a resin such as an epoxide, so that while a second portion 11 of the length of steel specimen 4 remains exposed for contact with a corrosive fluid, portion 7 of the same specimen is protected from such contact. A first portion 8 of the length of Admirality specimen 6 is similarly housed within probe shell 10 and embedded within filler material 9 so that while a second portion 12 of the length of Admiralty specimen 6 is exposed for contact with a corrosive environment, portion 8 of the same specimen is protected from such contact.

One end of Monel specimen 5 is swedged and slipfit into the exposed end of steel specimen 4, and the exposed end of Admiralty specimen 6 is swedged and slipfit into the unswedged end of Monel specimen 5. Thus the three specimens 4, 5 and 6 form a conduit through which a fluid heat-exchange medium, e.g. steam or water, can be circulated, for example in the direction suggested by the arrows shown at the open ends of spaced legs 2 and 3, to maintain the three specimens at substantially identical temperatures for comparative corrosion measurements. The fluid heat-exchange medium can be circulated by any suitable temperature control means 40 such as a pump and connecting conduits, preferably external to the corrosive environment into which the probe is to be extended. For use in a pressurized external fluid environment or with an internal heat-exchange medium under pressure, the slipfit connections between Monel specimen 5 and the other two specimens 4 and 6 can be brazed or soldered to achieve a pressure seal.

In the drawing, a first portion 13 of the length of Monel specimen 5 is shown enclosed within a dielectric corrosion-resistant covering 14, which may be made of a ceramic, a resin such as an epoxide or Teflon, or the like, for protection against contact with the environment to which the second portion 15 of the same specimen remains exposed.

Cylindrical probe shell 10, as shown in the drawing, is fitted with a yoke 16 which is made of a corrosion-resistant material, e.g. stainless steel, and which can be affixed to and sealed against the wall of the conduit or other apparatus (not shown) containing the fluid environment into which the probe is to be extended.

In the specific embodiment of the invention shown in the drawing, an electrically-conductive wire 17 is attached to probe 1 at a point 18 located at the juncture of steel specimen 4 and Monel specimen 5, establishing an electrically-conductive relationship between wire 17 and both of specimens 4 and 5. Wire 19 is similarly attached at point 20 to the juncture of Monel specimen 5 and Admiralty specimen 6 and is thereby in electrically-conductive relationship with both of specimens 5 and 6. Wire 30 is attached to Monel specimen 5 at a point 31 located at the juncture of protected portion 13 and exposed portion 15 and is in electrically conductive relationship with both of such portions. Wires 17, 19 and 30 extend from points 18, 20 and 31, respectively, through filler 9 and yoke 16 and are adapted for connection to external circuit means, as described hereinafter. The portions of wires 17, 19 and 30 extending from points 18, 20 and 31 to filler 9 are enclosed within corrosion-resistant coverings for protection from corrosion.

Also as shown in the drawing, electrically-conductive wires 21 and 22 are attached to steel specimen 4 and Admiralty specimen 6 at points 23 and 24, respectively, located within dielectric filler 9 but immediately adjacent the exposed portions 11 and 12 of specimens 4 and 6, and electrically-conductive wires 26 and 27 are attached to steel specimen 4 and Admiralty specimen 6 at points 28 and 29, respectively, located within filler 9 and spaced from the exposed portions 11 and 12 of specimens 4 and 6. Wires 21, 22, 26 and 27 also extend through filler 9 and yoke 16 and are adapted for connection to external circuitry, as hereinafter described. Wires 17, 19, 21, 22, 26, 27 and 30 are spaced apart within filler 9 such that none are in electrically-conductive contact with each other or with probe shell 10. At the yoke end of the probe, the seven wires emerge separately from filler 9 and their extensions therefrom are insulated from electrically-conductive contact with each other.

In the drawing, wires 17, 19, 21, 22, 26, 27, and 30 are shown connected to input terminals of a resistance-measuring circuit 25. In such a resistance-measuring circuit, there may be used any of a variety of circuits well known in the art, such as a Wheatstone bridge circuit. Generally, such a circuit includes means for establishing a difference in electric potential between any two of the wires to impress a current through the portion of the test specimen separating the points at which the two wires are attached, and means for measurement of the electric potential applied and the resulting current, from which measurements of the resistance of the portion of test specimen conducting the current can be readily determined. By such a resistance-measuring technique, the apparatus of this invention, as described in connection with the drawing, can provide a measure of the electrical resistance between any two of points 18, 20, 23, 24, 28, 29 and 31. Accordingly, it can provide relative measures of the extents or, when measurements are spaced in time, the rates of corrosion of the exposed portions 11, 15 and 12 of specimens 4 (steel), 5 (Monel) and 6 (Admiralty). If desired, comparisons of resistances or resistance-changes can also be made between the protected and exposed portions of any of specimens 4, 5 and 6, to provide a measure of the corrosion of any one or more of exposed portions 11, 12 and 15 relative to the protected portion of the same specimen. Since the electrical resistance of a conductor varies inversely with the cross-sectional area, the resistance-change measurements of the several exposed specimens are also useful in determinations of the changes in specimen cross-sectional area which have resulted from exposure to the corrosive test environment.

By way of illustration of the use of the apparatus of this invention, if it is desired to compare the corrosive effects of a given fluid environment on steel, Monel and Admiralty Brass, the probe shown in the drawing can be extended into the environment and appropriate resistance measurements made at time intervals of particular significance for the test. Preferably, the comparison should be made between nearly simultaneous determinations of the resistances of exposed specimens 11 (steel), 15 (Monel) and 12 (Admiralty). With the use of a conventional type of resistance-measuring circuit, the electric potential difference and current between wires 17 and 21 (representing the same quantities between points 18 and 23) are measured and converted according to the relationship Resistance=
$$\frac{\text{Electric potential difference}}{\text{Current}}$$

to determine the resistance of exposed steel specimen 11. Similarly, the electric potential difference and current between wires 19 and 30 (representing the same quantities between points 20 and 31) and between wires 19 and 22 (representing the same quantities between points 20 and 24) are measured and converted to the resistances of exposed Monel specimen 15 and exposed Admiralty specimen 12, respectively. The three resistance measurements thus obtained are compared as quantities inversely related to the cross-sectional areas subject to diminution by corrosion of the specimens.

To measure the extent or rate of corrosion of the exposed portion any of specimens 4, 5 and 6, relative to the protected portion of the same specimen, comparison should be made between nearly simultaneous determinations of the resistances of the appropriate exposed and protected portions. Such a test of the steel specimen 4, having a protected portion 7 and an exposed portion 11, would be accomplished by successively measuring with circuit 25 the potential difference and current between wires 21 and 26 and between wires 17 and 21, converting such measurements as before into the resistances of protected portion 7 and exposed portion 11, respectively, and comparing the resistances as quantities inversely related to the cross-sectional areas of the two portions. Similarly, corrosion of exposed portion 12 of Admiralty specimen 6 can be compared with that of its protected portion 8 by comparing the resistances derived from measurements of the potential difference and current between wires 19 and 22 and between wires 22 and 27, respectively, and corrosion of exposed portion 15 of Monel specimen 5 can be compared with that of its protected portion 13 by comparing the resistances derived from measurements of the potential difference and current between wires 19 and 30 and between wires 17 and 30, respectively.

To maintain the specimens to be compared at substantially identical temperatures to insure reliably comparative tests, or to maintain the specimens at a temperature different from that of the fluid test environment, a fluid heat-exchange medium can be circulated through probe 1, as shown by the arrows in the drawing, during the interval of desired temperature control.

It will be readily appreciated that any of various modifications of the apparatus shown in the drawing can be made within the scope of the present invention. Alternatively, other means 40 for controlling the temperature of the specimens can be employed. For example, an electric heating element can be disposed within tubular probe 1 and separated therefrom by a dielectric, and heated by an electric current passed through it as suggested by the same arrows adjacent legs 2 and 3 in the drawing. The number of dissimilar test specimens included in the probe is preferably three but may instead be two or four or more, provided each of such specimens is longitudinally disposed in a continuum between legs 2 and 3 formed by the body portion of the probe. The test specimens can be made of any electrically-conductive materials and need not be in conductive contact with each other but may instead be maintained in end-to-end relationship by other structural elements, e.g. dielectric coupling sleeves, provided there are included sufficient additional conductive wires in contact with at least two points spaced apart along the length of each of the test specimens which are desirably compared by electrical measurements. Probe 1 need not be U-shaped but may have any other desired shape having spaced legs such as 2 and 3. There can be substituted for yoke 16, probe shell 10 and filler 9 or any other suitable means for extending probe 1 into a fluid environment and maintaining the conductor wires free from contact with corrosive fluids and with each other.

It will also be appreciated that the protected portions of test specimens, shown in the drawing as 7, 8 and 13, are not essential to the use of the apparatus of this invention for corrosion measurements comparative of specimens made of dissimilar materials, which measurements are an important objective of the invention. Alternatively, wires 26 and 27 and coating 14 on Monel specimen 5 can be omitted without disadvantage to comparisons of corrosion of exposed portions 11 (steel), 12 (Admiralty) and 15 (Monel). Furthermore, with coating 14 omitted and the entire length of Monel specimen 5 exposed, wire 30 can also be omitted, leaving wire 17 to be used instead as the second of the two conductors necessarily in conductive relationship with points spaced apart along the exposed length of the Monel specimen.

It will be apparent from the foregoing that although the apparatus of the present invention has been described in some aspects with preferred embodiments, resort to modifications and variations can be had without departing from the spirit and scope of the invention, as those skilled in the art will readily understand. Such variations and modifications are therefore considered to be within the purview and scope of the appended claims.

1. Apparatus, for measuring the corrosion of a plurality of electrically conductive test specimens which are disposed in a fluid environment, comprising a corrosion resistant probe shell, a susbtantially U-shaped probe having its legs extending into said probe shell, said probe being of tubular structure and comprising a plurality of test specimen segments, each of said test specimen segments being of dissimilar electrically conductive material, electrical conductors extending through said probe shell from at least two points spaced apart along the length of each segment, a resistance measuring circuit adapted for connection to said electrical conductors, and temperature control means operatively connected to the legs of said probe for maintaining said segments at substantially the same temperature.

2. Apparatus, as defined in claim 1, in which said temperature control means comprises means for circulating a fluid medium through said probe.

3. Apparatus, as defined in claim 1, in which a portion of each of said segments is protected from contact with said fluid environment, and said electrical conductors extend from at least two points spaced apart along the length of each of the protected and unprotected portions.

4. Apparatus, as defined in claim 1, in which said probe comprises at least three of said segments.

References Cited
UNITED STATES PATENTS

| | | | |
|---|---|---|---|
| 2,735,759 | 2/1956 | Dravnieks | 324—71 X |
| 2,987,672 | 6/1961 | Marsh et al. | 324—71 |
| 2,994,821 | 8/1961 | Dravnieks | 324—71 X |
| 3,153,217 | 10/1964 | Cramer et al. | 324—71 X |
| 3,197,698 | 7/1965 | Schaschl | 324—71 X |
| 3,222,920 | 12/1965 | Marsh et al. | 324—71 |
| 3,264,561 | 8/1966 | Gustafson | 324—71 |

RUDOLPH V. ROLINEC, *Primary Examiner.*

E. E. KUBASIEWICZ, *Assistant Examiner.*